Dec. 1, 1959   F. R. BEYMER   2,914,902
GUARD FOR ROTARY MOWERS
Filed Nov. 13, 1956   2 Sheets-Sheet 1

Frank R. Beymer
INVENTOR
BY Carnow & Co.
ATTORNEYS.

Dec. 1, 1959     F. R. BEYMER     2,914,902
GUARD FOR ROTARY MOWERS
Filed Nov. 13, 1956     2 Sheets-Sheet 2
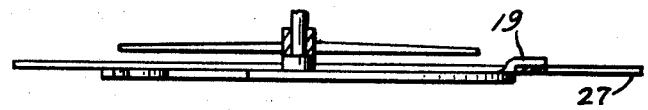
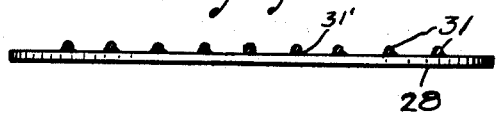
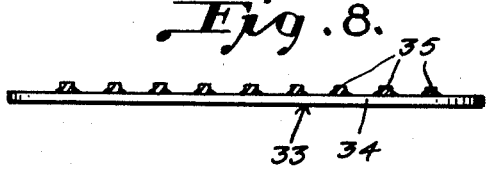
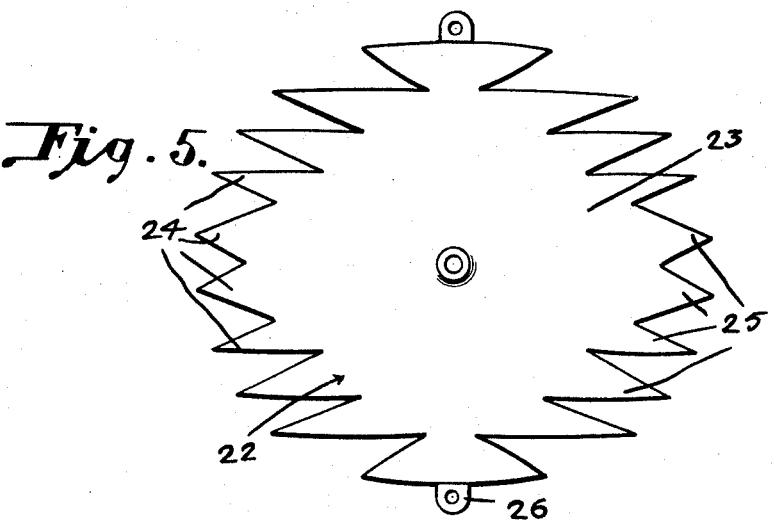
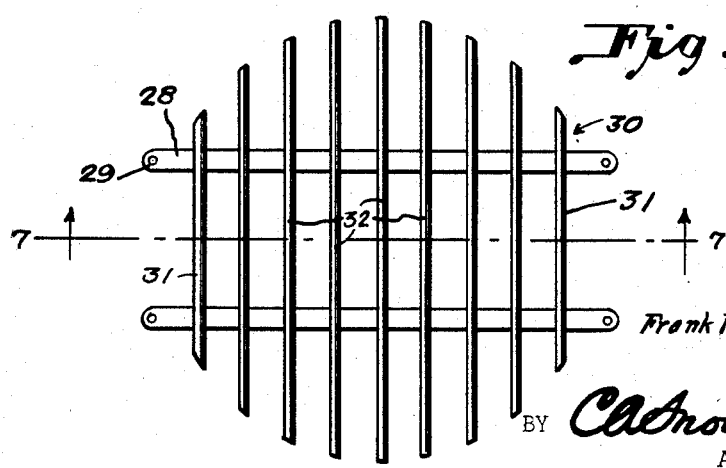
Frank R. Beymer
INVENTOR
ATTORNEYS.

United States Patent Office 2,914,902
Patented Dec. 1, 1959

2,914,902
GUARD FOR ROTARY MOWERS
Frank R. Beymer, Mansfield, Ohio
Application November 13, 1956, Serial No. 621,653
2 Claims. (Cl. 56—25.4)

This invention relates to a guard for rotary mowers.
In a number of types of rotary mowers at present in use, while the ends and sides of the mowers have guards to protect the user, these mowers do not have bottom guards to protect the user and the cutter. It is, therefore, an object of this invention to provide a guard for mounting beneath the rotary cutter which will protect both the cutter and the user.

Another object of this invention is to provide in a rotary mower, a guard constructed in the form of an attachment for a rotary mower, which can be readily adapted to various types of mowers so as to protect the user or operator against injury in the event the mower should roll or creep forward or backward when the the mower is left idle.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Figure 1:
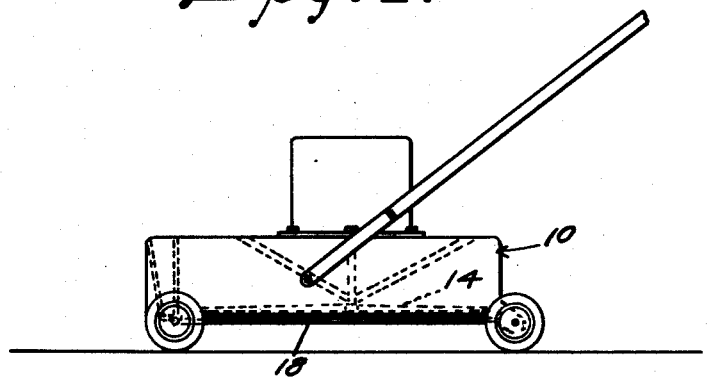
Figure 2:
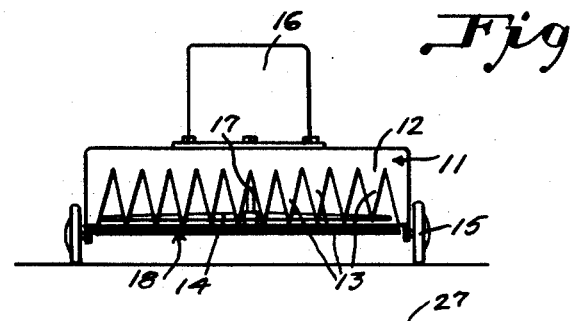
Figure 3:
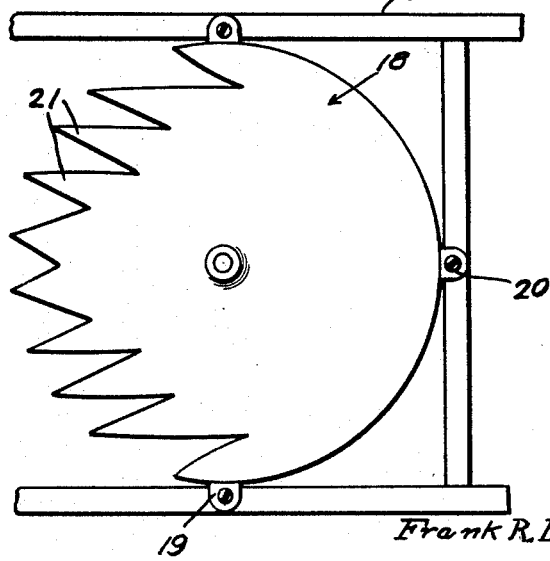

Referring to the drawings:
Figure 1 is a detail side elevation of a conventional rotary mower having a guard mounted thereon, constructed according to an embodiment of this invention.
Fig. 2 is a front elevation of the mower.
Fig. 3 is an enlarged bottom plan view partly broken away, of the guard showing the same in position on the mower.
Fig. 4 is a detail side elevation partly broken away showing the guard in position beneath the cutter plate.
Fig. 5 is a top plan view of a modified form of guard.
Fig. 6 is a top plan view of another modified form of guard.
Fig. 7 is a sectional view taken on line 7—7 of Fig. 6.
Fig. 8 is a sectional view similar to Fig. 7 showing a further modification of this invention.

Referring to the drawings, the numeral 10 designates generally a conventional rotary mower which is formed with a substantially rectangular housing 11 having a front wall 12 formed with downwardly projecting guard teeth 13 of substantially V-shape. The housing 11 contains a rotary cutting blade 14 and traction wheels 15 are carried by the housing 11 adjacent the front and rear thereof. The mower 10 also includes a power member 16 having a depending section 17 to which the cutting member 14 is secured. As shown in Figure 2, the teeth 13 preferably extend below the blade 14.

In order to provide a means whereby the operator of the mower may be protected against injury if the power member 16 is operating, and the mower is standing idle but may creep over the ground which may be uneven, I have provided a guard generally indicated at 18. The guard 18 is formed of a substantially disc-shaped blade having outwardly projecting ears 19 adapted to be secured by fastening members 20 to the bottom of the housing 11. The guard member 18 is provided along the forward portion thereof with a plurality of V-shaped teeth 21 which are adapted to gather any grass and which cooperate with the depending teeth 13 in protecting the operator of the machine from injury.

Where the mower 10 is of the type which will operate in either direction, a double guard member generally indicated at 22 and shown in Fig. 5, is used. The guard member 22 is formed of a substantially disc-shaped plate 23 having V-shaped teeth 24 and 25, projecting from the forward and rear edges thereof. The plate 23 also includes a pair of diametrically opposed apertured ears 26 which are adapted to be secured to the bottom of the mower housing or frame. The ears 19 and 26 may be outwardly offset, as shown in Fig. 4, to engage on the outer edge of the lower horizontal frame bar 27 of the mower construction.

Referring now to Figs. 6 and 7, there is disclosed another modification of this invention embodying a pair of parallel bars 28 having apertures 29 at each end thereof through which fastening means may be extended to secure the bars 28 to the bottom of the mower housing. The guard generally indicated at 30 and shown in Fig. 6, also includes a plurality of parallel rods 31 which are round in transverse section and are welded as indicated at 31' (see Fig. 7), or otherwise firmly secured to the bars 28. These rods 31 progressively increase in length from the outermost to the inner one indicated at 32 so that in plan view the guard 30 will snugly engage below the housing 11.

Referring now to Fig. 8 there is disclosed another guard generally indicated at 33 which is similar to guard 30. The guard 33 is formed of a pair of parallel bars 34 similar to bars 28 and the bars 34 have fixed to the upper sides thereof right angularly disposed and spaced apart bars 35. The bars 35 are flat or rectangular in cross section, as shown in Fig. 8.

With a mower guard construction as hereinbefore described the operator of the mower will be protected against injury in the event the mower should creep when the power member is in operation or when the mower is disposed on a slight inclination and is substantially unattended with the operator positioned very close thereto.

What is claimed is:
1. In a rotary mower for grass and the like having a housing and a rotary cutter blade disposed therein, the improvements of vertically-extending V-shaped teeth along the front of the housing having the points thereof directed downwardly to comb the grass and segregate blades thereof into individual groups held in upstanding cutting position, and a horizontally disposed guard plate supported from the housing below the cutter blade and having a leading edge terminating between said vertically-extending teeth and the orbit described by the ends of the cutter blade, said leading edge having horizontally-extending V-shaped teeth with the points thereof directed forwardly of the housing, said horizontally-extending V-shaped teeth cooperating with the vertically-extending V-shaped teeth to maintain the combed and segregated groups of grass blades in such upstanding cutting position until severed by the cutter blade.

2. In a rotary mower for grass and the like having a housing and a cutter blade mounted therein for rotation about a vertical axis, the improvements of vertically-extending V-shaped teeth along the front of the housing having the points thereof directed downwardly and extending below the cutter blade to comb the grass and wedge blades thereof into individual groups held in an upstanding cutting position, and a horizontally disposed guard plate supported from the housing below the cutter blade to prevent injury from said blade, the forward edge of the guard plate terminating between said vertically-extending teeth and the orbit described by the ends of the cutter blade, said forward edge having horizontally-extending V-shaped teeth with the points thereof directed forwardly of the housing, said points of the vertically-extending and the horizontally-extending V-shaped teeth being substantially coincident with one another transversely of the housing to enable the horizontally-extending teeth to receive said groups of grass blades between such teeth and thereby maintain said groups of grass blades in such upstanding cutting position until severed by the cutting blade.

References Cited in the file of this patent

UNITED STATES PATENTS

| | | |
|---|---|---|
| 2,242,524 | Hunt | May 20, 1941 |
| 2,485,729 | Gentry | Oct. 25, 1949 |
| 2,539,779 | Grosso | Jan. 30, 1951 |
| 2,547,328 | Koch et al. | Apr. 3, 1951 |
| 2,549,317 | Laughlin | Apr. 17, 1951 |
| 2,557,598 | Daggett | June 19, 1951 |
| 2,565,044 | Puls | Aug. 21, 1951 |
| 2,653,381 | Rooke | Sept. 29, 1953 |
| 2,722,095 | Farney | Nov. 1, 1955 |